(12) United States Patent
Noor et al.

(10) Patent No.: US 8,880,586 B2
(45) Date of Patent: Nov. 4, 2014

(54) METADATA SUBSCRIPTION REGISTRY

(75) Inventors: David I. Noor, Redmond, WA (US); Slobodan M. Bojanic, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 904 days.

(21) Appl. No.: 12/756,196

(22) Filed: Apr. 8, 2010

(65) Prior Publication Data

US 2011/0252081 A1 Oct. 13, 2011

(51) Int. Cl.
| | |
|---|---|
| G06F 15/16 | (2006.01) |
| G06Q 10/10 | (2012.01) |
| G06F 9/445 | (2006.01) |
| G06Q 10/00 | (2012.01) |
| H04L 12/18 | (2006.01) |
| H04N 13/00 | (2006.01) |
| H04N 21/84 | (2011.01) |

(52) U.S. Cl.
CPC ............ *G06Q 10/10* (2013.01); *H04N 13/0066* (2013.01); *H04N 21/84* (2013.01); *G06F 9/44505* (2013.01); *G06Q 10/00* (2013.01); *H04L 12/18* (2013.01); *H04L 12/1859* (2013.01)
USPC .... 709/203; 709/219; 707/769; 707/E17.014; 345/473

(58) Field of Classification Search
CPC . G06F 9/44505; H04N 13/0066; H04N 21/84
USPC ......................................... 709/203
See application file for complete search history.

(56) References Cited

U.S. PATENT DOCUMENTS

| | | | |
|---|---|---|---|
| 8,352,544 B2 * | 1/2013 | Fang et al. ................... | 709/203 |
| 2002/0107973 A1 | 8/2002 | Lennon et al. | |
| 2005/0234969 A1 | 10/2005 | Mamou et al. | |
| 2007/0008321 A1 * | 1/2007 | Gallagher et al. ............ | 345/473 |
| 2007/0283002 A1 | 12/2007 | Bornhoevd et al. | |
| 2008/0320560 A1 | 12/2008 | Casey et al. | |
| 2009/0024561 A1 | 1/2009 | Palanisamy | |
| 2009/0043980 A1 * | 2/2009 | McBride et al. .............. | 711/162 |
| 2009/0055751 A1 | 2/2009 | DePue et al. | |
| 2009/0327894 A1 * | 12/2009 | Rakib et al. .................. | 715/719 |
| 2011/0252081 A1 * | 10/2011 | Noor et al. .................... | 709/203 |
| 2011/0276585 A1 * | 11/2011 | Wagner et al. ................ | 707/769 |

OTHER PUBLICATIONS

"Metadata Workbench", Retrieved at << http://it.toolbox.com/wiki/index.php/Metadata_Workbench>>, Editor R K, 2010, Pages.

(Continued)

*Primary Examiner* — Arvin Eskandarnia
(74) *Attorney, Agent, or Firm* — Nicholas Chen; Kate Drakos; Micky Minhas

(57) ABSTRACT

Updated metadata can be requested from a set of remote servers according to a subscription registry. The subscription registry can include information for retrieving metadata from the remote servers. The requested updated metadata can be received from the remote servers. The metadata can be impact analysis and lineage metadata, and it can be requested from and received at an impact analysis and lineage metadata service. In addition, at least a portion of the metadata from the remote servers can be parsed, and a reference to a new remote server can be discovered in the metadata. Information for retrieving metadata from the new remote server can be added to the subscription registry, and metadata can be retrieved from the new remote server according to the subscription registry.

20 Claims, 5 Drawing Sheets

(56) References Cited

OTHER PUBLICATIONS

"Oracle Warehouse Builder 10g", Retrieved at << http://www.dwlogic.com/community/articles/Oracle10g_DW_Architecture.pdf >>, Architectural White paper, Feb. 2004, pp. 1-16.

"Metadata Component Provider", Retrieved at << http://www.metaintegration.net/ >> on Mar. 17, 2010, pp. 1-4.

"Meta Integration Solutions Through Pictures", Retrieved at << http://www.metaintegration.net/Products/Overview/ >>, on Mar. 17, 2010, pp. 1-8.

Friedrich, John R., "Metadata Based Impact and Lineage Analysis Across Heterogeneous Metadata Sources", Retrieved at << http://www.metaintegration.net/Products/News/index.html >>, The 9th Annual Wilshire Meta-Data Conference and the 17th Annual DAMA International Symposium, May 24, 2005, pp. 1-55.

Friedrich, John R., "Meta-Data Version and Configuration Management in Multi-Vendor Environments", Retrieved at << http://delivery.acm.org/10.1145/1070000/1066251/p799-friedrich.pdf?key1=1066251&key2=0166160721&coll=GUIDE&dl=GUIDE&CFID=85078295&CFTOKEN=50317049 >>, Proceedings of the 2005 ACM SIGMOD international conference on Management of data 2005, Jun. 14-16, 2005, pp. 799-804.

Bremeau, Christian H., "Metadata Flow in a Multi-Vendor Enterprise Toolset", Retrieved at << http://www.metaintegration.net/Products/News/index.html >>, May 25, 2004, pp. 1-46.

Baragoin, et al., "DB2 Cube Views Getting Started with Meta Integration", Retrieved at << http://www.metaintegration.net/Publications/2003-IBM-DB2CubeViewsRedPaper-MetaIntegration.pdf >>, Sep. 2003, pp. 116.

* cited by examiner

METADATA SUBSCRIPTION REGISTRY

BACKGROUND

Some systems collect metadata from remote servers. As used herein a server is a computer program hosted on a computer in a network, such that the program can serve metadata to other parts of the network. A remote server is a server that is hosted on one or more physical or virtual machines that are different from a physical or virtual machine that is requesting metadata from the remote server. Multiple servers may be hosted on one such machine (e.g., a file server and a report server may be hosted on the same machine). When metadata is to be collected from a particular remote server, a user can enter command line parameters for a bridge (a command that can be executed to retrieve data from a remote server), and the bridge can execute to retrieve the metadata from the remote server. The retrieved metadata may be used in various ways. For example, the metadata may be processed by a metadata service, which can provide information from the metadata in some useable form. For example, impact analysis and lineage (IAL) metadata is metadata that reveals how different computer components (e.g. different servers, different database tables, different database table columns, etc.) depend on each other. An IAL metadata service may collect such IAL metadata and provide information from the IAL metadata in some useable form. As an example, an IAL metadata service may allow the IAL metadata to be searched to reveal features of a computer system, such as information on how data flows through the system.

SUMMARY

Whatever the advantages of previous metadata retrieval tools and techniques, they have neither recognized the metadata subscription registry tools and techniques described and claimed herein, nor the advantages produced by such tools and techniques.

In one embodiment, the tools and techniques can include requesting updated metadata from a set of remote servers according to a subscription registry. As used herein, a subscription registry is a data structure that includes information for retrieving metadata from remote servers that are being subscribed to. Subscription registries may take various different forms, and some examples of those different forms are discussed below. Requesting updated metadata from one or more servers refers to requesting metadata from server(s) from which metadata has already been requested previously. The requested updated metadata can also be received from the remote servers.

In another embodiment of the tools and techniques, updated impact analysis and lineage metadata can be requested from a set of remote servers according to a subscription registry, which can include information for retrieving metadata from the remote servers. The requested metadata can be received at an impact analysis and lineage metadata service.

In yet another embodiment of the tools and techniques, updated metadata can be retrieved from a set of remote servers according to a subscription registry, which can include information for retrieving metadata from the remote servers. At least a portion of the metadata from the remote servers can be parsed, and a reference to a new remote server can be discovered in the metadata. Information for retrieving metadata from the new remote server can be added to the subscription registry, and metadata can be retrieved from the new remote server according to the subscription registry.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
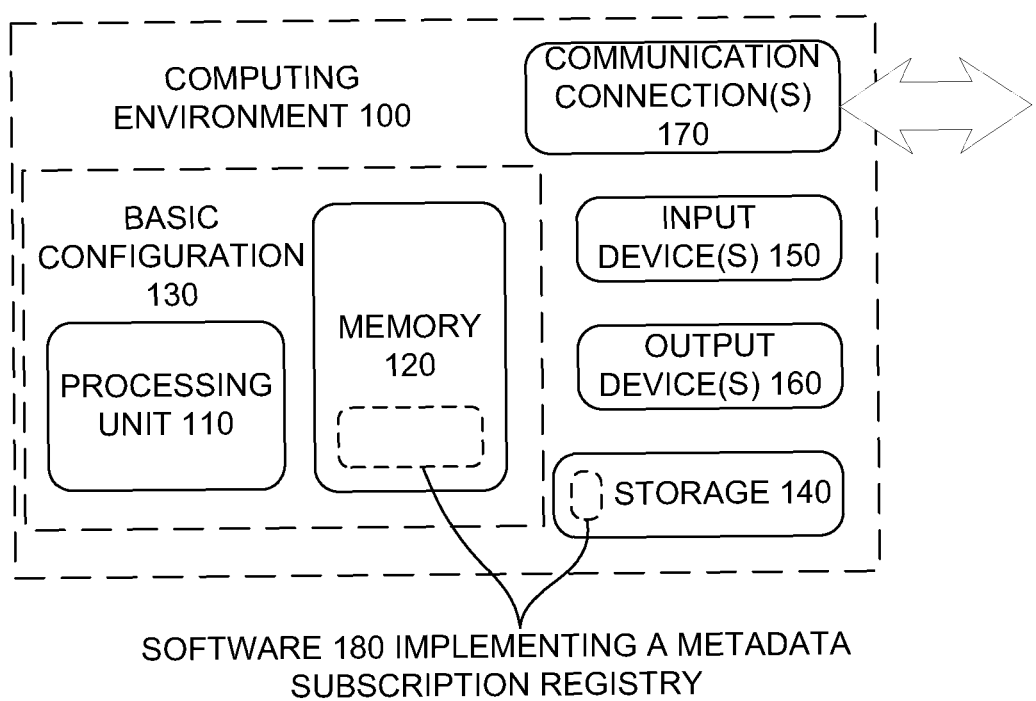
FIG. 1 is a block diagram of a suitable computing environment in which one or more of the described embodiments may be implemented.

Embodiments described herein are directed to techniques and tools for improved metadata retrieval from remote sources. Such improvements may result from the use of various techniques and tools separately or in combination.

Such techniques and tools may include retrieving updated metadata (such as updated IAL metadata) from remote servers according to a subscription registry. The subscription registry can include an entry for each remote server, where each entry can include information for retrieving metadata from that server. Examples of information in a server entry in the registry include a server name, other connection information for connecting to the server (connection string, etc.), a schedule for metadata retrieval from the server, and/or filter information that limits the metadata to be retrieved from the server. At least a portion of metadata retrieved from the remote servers can be parsed, and references to new remote servers (i.e., servers without current entries in the subscription registry) may be discovered in the metadata. Information for retrieving metadata from the new remote servers can be added to the subscription registry so that metadata from those new servers can be retrieved according to the subscription registry. Such additions to the registry may be done automatically or after receiving user input approving the additions.

Accordingly, one or more substantial benefits may be realized from the metadata subscription registry tools and techniques described herein. The subscription registry can make it easier to initially retrieve and to subsequently update metadata from remote servers, so that up-to-date metadata can be collected for use, such as use by a metadata service. The registry can allow metadata to be retrieved according to the subscription registry, which may be done without a user entering command line parameters for a bridge each time metadata is to be retrieved from a remote server. In addition, new servers can be automatically identified from the metadata that is received, which can relieve administrative users of identifying such new servers (or can at least supplement administrative users' efforts in identifying such new servers). Entries for those identified new servers can be added to the subscription registry.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used as a metadata retriever, a metadata service, and/or a remote server from which metadata can be retrieved. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing a metadata subscription registry.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include non-transitory computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment.

These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Metadata Subscription Registry System and Environment

Figure 2:
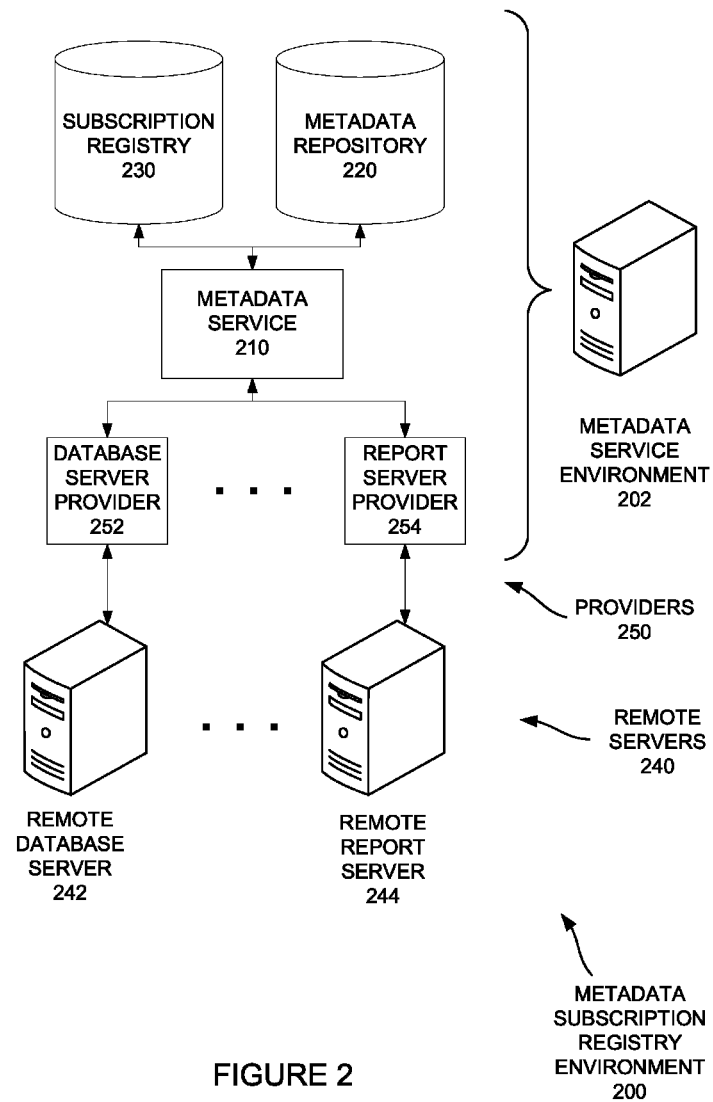
FIG. 2 is a schematic diagram of a metadata subscription registry computing environment.

FIG. 2 is a block diagram of a metadata subscription registry environment (200) in conjunction with which one or more of the described embodiments may be implemented. The metadata subscription registry environment (200) can include a metadata service environment (202). For example, the metadata service environment (202) may be a computing environment such as the computing environment (100) discussed above. The metadata service environment (202) can include a metadata service (210). For example, the metadata service (210) can be an IAL metadata service. The metadata service (210) can be hosted on a machine that also hosts other programs, such as server programs. For example, the metadata service (210) may be part of Microsoft's SQL Server® database server application. Metadata for the metadata service (210) can be stored in a metadata repository (220). The metadata in the metadata repository (220) may store only metadata relating to the particular metadata service (210) (such as IAL metadata for an IAL metadata service), or it may also include additional metadata for other purposes.

The metadata service (210) can also access a subscription registry (230). The subscription registry (230) can include information that can be used by the metadata service (210) in retrieving metadata from remote servers (240). The subscription registry (230) can take any of various forms, such as a database table, etc. The subscription registry may include an entry for each of the remote servers (240) from which the metadata service (210) will retrieve updated metadata. For example, each entry may include an identifier for the server, such as a server name. Each entry may also include other connection information, such as a connection string, etc. One or more of the entries may also include security credentials to be used in requesting metadata from the corresponding remote server. For example, an entry for a remote server may include a digital certificate, digital signature, user name and/or password for the server. Entries may also include filter information that can limit what metadata is to be received from the corresponding remote servers. For example, the filter information may define what metadata is to be included and/or what metadata is to be excluded. In a specific example of a remote report server, filter information may limit the metadata to be received and included in the metadata repository (220), so that the metadata only includes metadata for certain listed reports, and excludes metadata for other reports. As another example, for a remote database server, filter information may list certain database table columns from which metadata is not to be received and included in the metadata repository (220).

Additionally, the subscription registry (230) may include one or more update schedules for retrieving updates from the remote servers (240). The update schedule(s) can take several different forms. For example, there may be one schedule for retrieving updated metadata from servers corresponding to all the entries in the subscription registry (230), or each entry may have a separate schedule for retrieving updated metadata for the server corresponding to that entry. For example, a schedule for a registry entry may indicate that updated metadata is to be requested from the corresponding sever at a particular time each day, at a particular time and day each week or month, or according to some other schedule.

As is illustrated in FIG. 2, the remote servers (240) may include different types of servers, such as a remote database server (242), a remote report server (244), etc. The metadata service environment (202) may also include providers (250) that can be invoked by the metadata service (210) to retrieve requested metadata from the remote servers (240). For example, a different provider (250) may interact with each different type of remote server (240). Such providers (250) can be in the form of modules that can be configured to interact with the metadata service (210) and with a particular type of server from the remote servers (240). The providers (250) can also be configured to request the correct type of metadata that is available on the corresponding type of remote server (240), and to translate received metadata into a standardized form that can be used by the metadata service (210). The providers (250) can pass that metadata to the metadata service (210) in that standardized form.

For example, a database server provider (252) can be configured to interact with the remote database server (242) (e.g., if the remote database server (242) is a SQL Server® database server, then the database server provider (252) can be a provider that is configured to interact with SQL Server® database servers), a report server provider (254) may be configured to interact with the remote report server (244), etc. The providers (250) can be registered with the metadata service (210), so that the metadata service (210) can invoke one of the providers (250) when requesting updated metadata from a corresponding one of the remote servers (240). For example, the metadata service (210) can expose one or more application programming interfaces, and can interact with the providers (250) by exchanging application programming interface calls. Alternatively, the metadata service (210) can interact with the providers (250) in some other way. For example, the providers (250) may be included in the same software application as the metadata service (210), and the metadata service (210) may make function calls to the providers (250). As another example, the providers (250) may be located in a separate computing environment from the metadata service environment (202), and the metadata service (210) may communicate with the providers (250) with messages, such as HTTP messages.

As an example of requesting metadata from one of the remote servers (240), at a scheduled time a registry entry corresponding to the remote server (240) can be loaded by the metadata service (210), and the entry itself or information from the entry can be passed to one of the providers (250) for that type of server. For example, if the remote server is the remote report server (244), then the metadata service (210) can pass information to the report server provider (254). The report server provider (254) can use the information (connection information, security credentials, filter information, etc.) to request updated metadata from the remote report server (244) using communications that are recognized by the remote report server (244). The report server provider (254) can also receive the requested updated metadata back from the remote report server (244) (if there is updated metadata on the report server that meets the criteria of the request from the report server provider (254)). The report server provider (254) can parse the received metadata, translate the received metadata to a form that is useable by the metadata service (210), and discover references (if any) in the metadata to other remote servers. The report server provider (254) can pass the translated updated metadata to the metadata service (210), and the metadata service (210) can store the updated metadata in the metadata repository (220) for use by the metadata service.

If the report server provider (254) identifies references to one or more other remote servers, the report server provider (254) can pass the information for those other remote server(s) to the metadata service (210) for processing. The metadata service (210) can determine whether the subscription registry (230) already includes one or more entries for the other remote server(s). If not, then the metadata service (210) can invoke a technique for adding one or more entries for these new remote servers. This may include automatically adding the entries, or requesting and receiving user input approval for the entries before the entries are added. If such approval is requested but not provided, then the new entries may not be added to the subscription registry (230).

The providers (250) can also parse received metadata and identify references in the metadata to other remote servers (i.e., remote servers besides the server that sent the metadata). The information for those servers that are discovered can then be passed to the metadata service (210). For example, the providers (250) may add the discovered server information to a queue that is processed by the metadata service (210). Thus, new servers can be discovered automatically, so that entries for those servers may be added to the subscription registry (230). The metadata service (210) may automatically add entries for the new remote servers to the subscription registry (230), after checking to make sure the registry (230) does not already include entries for those new servers. However, it may be desirable to request user approval before adding new entries to the subscription registry (230). For example, it may not be desirable to add some new servers to the metadata repository for security reasons. Also, for some new servers, a user may provide additional connection information so that metadata can be retrieved from those servers. If user approval is to be requested, then the metadata service (210) can request such approval, such as by invoking a user interface device to visually and/or audibly provide a prompt. User input can then be received, where the input can approve or disapprove of adding an entry for the new server to the subscription registry (230). A user may also be able to provide user input to edit the new information to be included in the subscription registry entry. For example, user input may be received to change or supplement connection information, and/or to change or supplement filter information. User input may also be received to edit existing entries in the subscription registry (230).

III. Metadata Subscription Registry Techniques

Several metadata subscription registry techniques will now be discussed. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 3:
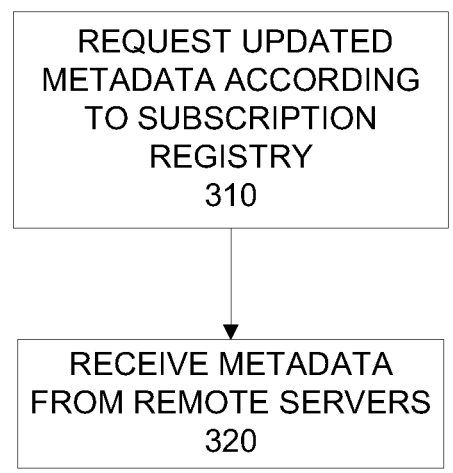
FIG. 3 is a flowchart of a metadata subscription registry technique.

Referring to FIG. 3, a metadata subscription registry technique will be discussed. In the technique, updated metadata can be requested (310) from a set of remote servers. The updated metadata can be requested (310) according to a subscription registry that includes information for retrieving metadata from the remote servers. In addition, the metadata can be received (320) from the remote servers.

Requesting (310) updated metadata from the set of remote servers according to the subscription registry can include loading server entries from the registry and processing the entries. The subscription registry can include filter information that limits metadata to be received from one or more of the remote servers. Also, the subscription registry can include registry entries that include for each server in the set of remote servers a registry entry that includes a server identifier. At least one of the entries can include a server name and additional connection information for a corresponding server in the set of remote servers. Also, at least one of the entries can include security credentials for a corresponding server in the set of servers. The registry can also include one or more update schedules for requesting updated metadata.

Requesting (310) updated metadata from the set of remote servers according to the subscription registry can include requesting the updated metadata from provider modules that in turn request the updated metadata from the set of remote servers and receive the updated metadata from the remote servers. The provider modules can include different modules for requesting (310) the updated metadata from different types of servers.

The metadata can be impact analysis and lineage metadata, and the requested metadata can be received at an impact analysis and lineage metadata service.

The technique can further include parsing at least a portion of the metadata from the remote servers, discovering a reference to a new remote server in the metadata, adding to the subscription registry information for retrieving metadata from the new remote server, requesting metadata from the new remote server, and receiving the metadata from the new remote server. Adding to the subscription registry information for retrieving metadata from the new remote server may be done by adding the information directly to the subscription registry when a reference to a new remote server is discovered. However the information may be added in some other manner, such as by processing or translating the information before adding it to the registry and/or by writing the information to a temporary storage location before adding the information to the registry. Adding to the subscription registry information for retrieving metadata from the new remote server can be done automatically. Alternatively, the technique can further include requesting approval from a user to add information to the subscription registry for retrieving metadata from the new remote server, and receiving user input providing the approval. The information for retrieving metadata from the new remote server can be added to the subscription registry in response to the user input.

Figure 4:
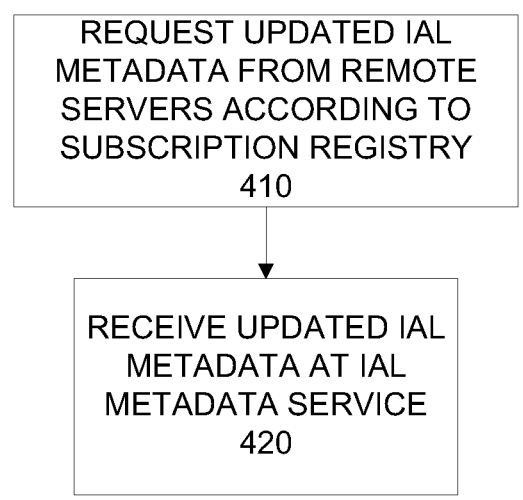
FIG. 4 is a flowchart of another metadata subscription registry technique.

Referring now to FIG. 4, another metadata subscription registry technique will be discussed. In the technique, updated impact analysis and lineage metadata can be requested (410) from a set of remote servers according to a subscription registry. The subscription registry can include information for retrieving metadata from the remote servers. The technique can also include receiving (420) the requested updated metadata at an impact analysis and lineage metadata service. The subscription registry can include filter information that limits metadata to be received from one or more of the remote servers.

Requesting (410) the updated metadata from the set of remote servers according to the subscription registry can include requesting the updated metadata from a plurality of provider modules that in turn request the updated metadata from the set of remote servers and receive the updated metadata from the remote servers. Also, receiving (420) the updated metadata at the impact analysis and lineage metadata service can include receiving the updated metadata from the provider modules.

Figure 5:
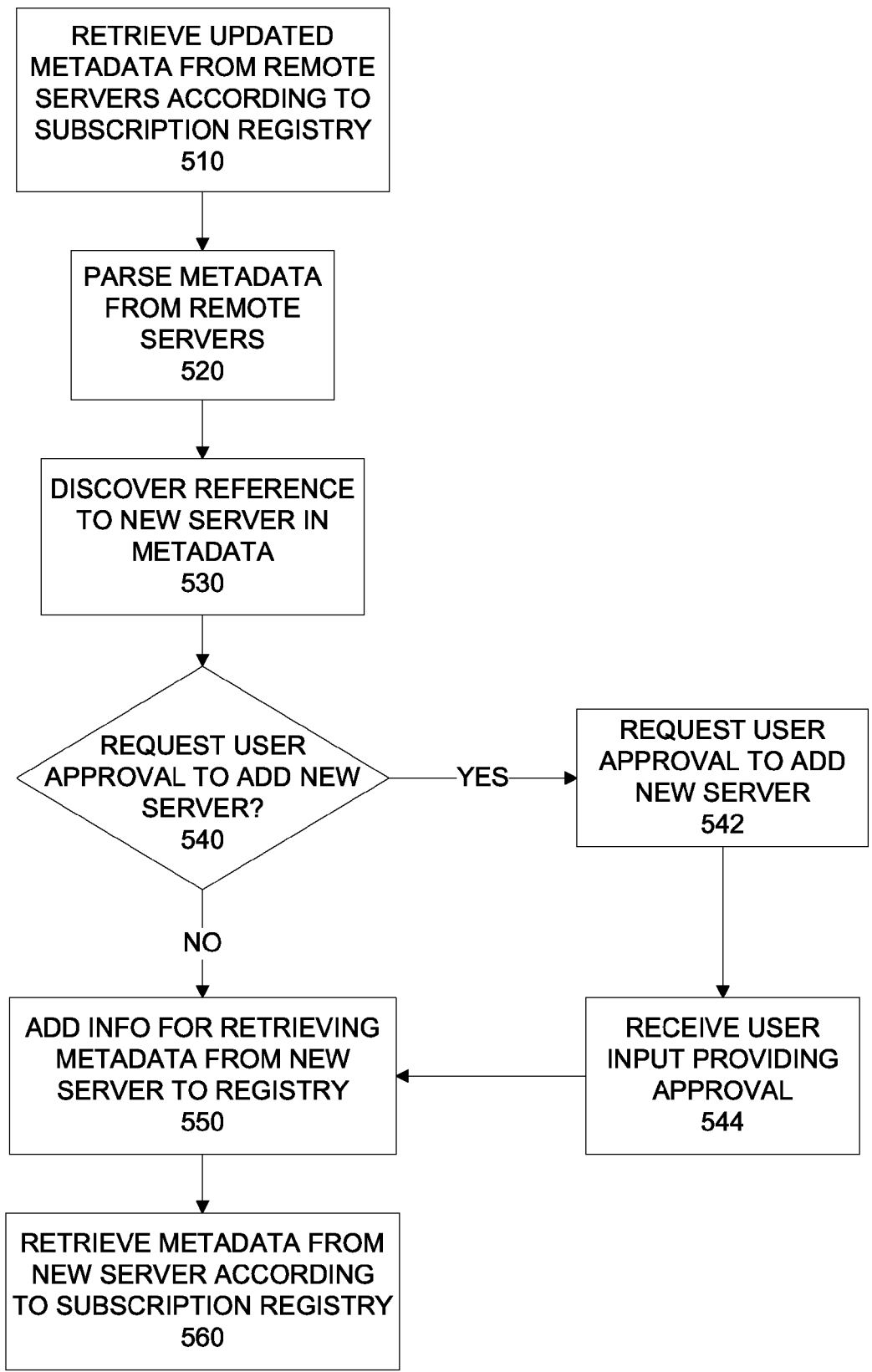
FIG. 5 is a flowchart of yet another metadata subscription registry technique.

Referring now to FIG. 5, yet another metadata subscription registry technique will be discussed. In the technique, updated metadata can be retrieved (510) from a set of remote servers according to a subscription registry. The subscription registry can include information for retrieving metadata from the remote servers. The technique can also include parsing (520) at least a portion of the metadata from the remote servers, and discovering (530) a reference to a new remote server in the metadata. If it is determined (540) that user approval for adding an entry for the new server will be requested, then approval to add to the subscription registry information for retrieving metadata from the new remote server can be requested (542), and user input providing such approval can be received (544). In response to the user input, information for retrieving metadata from the new remote server can be added (550) to the subscription registry. If user approval is requested but not received, then an entry for the discovered server may not be added to the subscription registry. If it is determined (540) that user approval for adding an entry for the new server will not be requested, then adding (550) to the subscription registry information for retrieving metadata from the new remote server may be done automatically, without seeking user approval.

Referring still to FIG. 5, after information for retrieving metadata from the new server is added (550) to the registry, metadata can be retrieved (560) from the new remote server according to the subscription registry. In some situations, such as where an entry for the discovered server is already present in the subscription registry, user approval may not be sought, and an entry for the server may not be added to the registry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
    requesting updated metadata from a set of remote servers according to a subscription registry, the subscription registry including information for retrieving metadata from the remote servers; and
    receiving the requested updated metadata from the remote servers;
    parsing at least a portion of the metadata received from the remote servers;
    discovering a reference to a new remote server in the metadata received from the remote servers, the subscription registry not including information for retrieving metadata from the new remote server prior to discovering the reference to the new remote server in the metadata received from the remote servers;
    in response to discovering the reference to the new remote server in the metadata received from the remote servers, adding to the subscription registry information for retrieving metadata from the new remote server;
    requesting metadata from the new remote server, the requesting of metadata from the new remote server using the information that was added to the subscription registry for retrieving metadata from the new remote server; and
    receiving metadata from the new remote server in response to the requesting of metadata from the new remote server.

2. The method of claim 1, wherein the subscription registry comprises filter information that limits metadata to be received from one or more of the remote servers.

3. The method of claim 1, wherein the metadata is impact analysis and lineage metadata and receiving the requested metadata comprises receiving the requested metadata at an impact analysis and lineage metadata service.

4. The method of claim 1, wherein requesting updated metadata from the set of remote servers according to the subscription registry comprises loading server entries from the registry and processing the entries.

5. The method of claim 1, wherein the subscription registry comprises a plurality of registry entries, including for each server in the set of remote servers a registry entry comprising a server identifier.

6. The method of claim 5, wherein at least one of the plurality of entries comprises a server name and additional connection information for a corresponding server in the set of remote servers.

7. The method of claim 5, wherein at least one of the plurality of entries comprises security credentials for a corresponding server in the set of remote servers.

8. The method of claim 1, wherein the registry comprises one or more update schedules for requesting updated metadata.

9. The method of claim 1, wherein requesting updated metadata from the set of remote servers according to the subscription registry comprises requesting the updated metadata from a plurality of provider modules that in turn request the updated metadata from the remote servers and receive the updated metadata from the remote servers.

10. The method of claim 9, wherein the provider modules comprise different modules for requesting the updated metadata from different types of servers.

11. The method of claim 1, wherein adding information for retrieving metadata from the new remote server to the subscription registry is done automatically.

12. The method of claim 1, further comprising:
    requesting approval from a user to add information to the subscription registry for retrieving metadata from the new remote server; and
    receiving user input providing the approval;
    wherein adding to the subscription registry the information for retrieving metadata from the new remote server is done in response to the user input.

13. The method of claim 1, wherein:
    the metadata is impact analysis and lineage metadata;
    requesting updated metadata from the set of remote servers according to the subscription registry comprises loading server entries from the registry and processing the entries, one or more of the server entries comprising a server name;
    at least one of the server entries comprises security credentials for a corresponding server in the set of remote servers; and
    requesting updated metadata from the set of remote servers according to the subscription registry comprises requesting the updated metadata from a plurality of provider modules that in turn request the updated metadata from the set of remote servers and receive the updated metadata from the remote servers.

14. A computer system comprising:
    at least one processor, the at least one processor comprising hardware; and
    a memory comprising instructions stored thereon that when executed by the at least one processor cause the at least one processor to perform acts comprising:

requesting updated impact analysis and lineage metadata from a set of remote servers according to a subscription registry, the subscription registry including information for retrieving metadata from the remote servers;

receiving the requested updated metadata at an impact analysis and lineage metadata service;

automatically identifying from the requested updated metadata a new remote server for which information for retrieving metadata is not included in the subscription registry prior to automatically identifying the new remote server; and in response to automatically identifying the new remote server, adding an entry for the new remote server in the subscription registry, the entry including information for retrieving metadata from the new remote server; and retrieving metadata from the new remote server using the information that was added to the subscription registry for retrieving metadata from the new remote server.

15. The computer system of claim 14, wherein the subscription registry comprises filter information that limits metadata to be received from one or more of the remote servers.

16. The computer system of claim 14, wherein:

requesting updated metadata from the set of remote servers according to the subscription registry comprises requesting the updated metadata from a plurality of provider modules that in turn request the updated metadata from the set of remote servers and receive the updated metadata from the remote servers; and receiving the updated metadata at the impact analysis and lineage metadata service comprises receiving the updated metadata from the provider modules.

17. The computer system of claim 14, wherein the metadata retrieved from the new remote server using the information that was added to the subscription registry for retrieving metadata from the new remote server comprises impact analysis and lineage metadata.

18. One or more computer-readable storage media having computer-executable instructions embodied thereon that, when executed by at least one processor comprising hardware, cause the at least one processor to perform acts comprising:

retrieving updated metadata from a set of remote servers according to a subscription registry, the subscription registry including information for retrieving metadata from the remote servers;

parsing at least a portion of the metadata from the remote servers;

discovering a reference to a new remote server in the metadata;

adding to the subscription registry information for retrieving metadata from the new remote server; and retrieving metadata from the new remote server according to the subscription registry, retrieving metadata from the new remote server using the information that was added to the subscription registry for retrieving metadata from the new remote server.

19. The one or more computer-readable storage media of claim 18, wherein adding to the subscription registry information for retrieving metadata from the new remote server comprises automatically adding to the subscription registry information for retrieving metadata from the new remote server.

20. The one or more computer-readable storage media of claim 18, wherein the acts further comprise:

requesting user approval to add to the subscription registry information for retrieving metadata from the new remote server; and receiving user input providing the approval;

wherein adding to the subscription registry the information for retrieving metadata from the new remote server is done in response to the user input.

* * * * *